2 Sheets—Sheet 1.

G. W. HATCH.
MACHINE FOR GATHERING AND LOADING FLAX &c.

No. 48,064. Patented June 6, 1865.

Witnesses
W. H. Burridge
A. W. McClellan

Inventor
G. W. Hatch

G. W. HATCH.
MACHINE FOR GATHERING AND LOADING FLAX &c.

No. 48,064. Patented June 6, 1865.

Witnesses
W. H. Burridge
A. W. McClellan

Inventor
G. W. Hatch

UNITED STATES PATENT OFFICE.

G. W. HATCH, OF PARKMAN, OHIO.

IMPROVED MACHINE FOR GATHERING AND LOADING FLAX, &c.

Specification forming part of Letters Patent No. 48,064, dated June 6, 1865.

*To all whom it may concern:*

Be it known that I, G. W. HATCH, of Parkman, in the county of Geauga and State of Ohio, have invented certain new and useful Improvements in a Machine for Gathering and Loading Flax, Corn, Hay, &c.; and I do hereby declare that the following is a full and complete description of the construction and operation of the same, reference being had to the accompanying drawings, making a part of this specification, in which—

Figure 1:
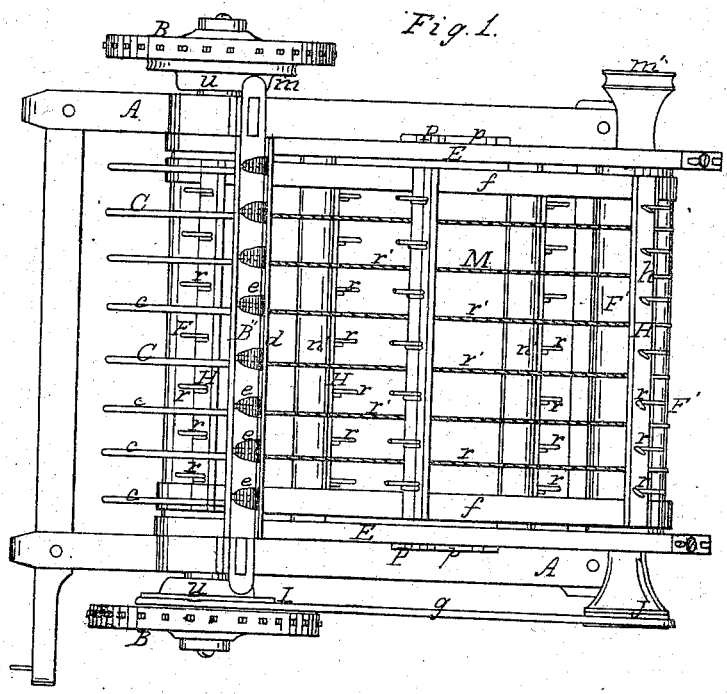
Figure 2:
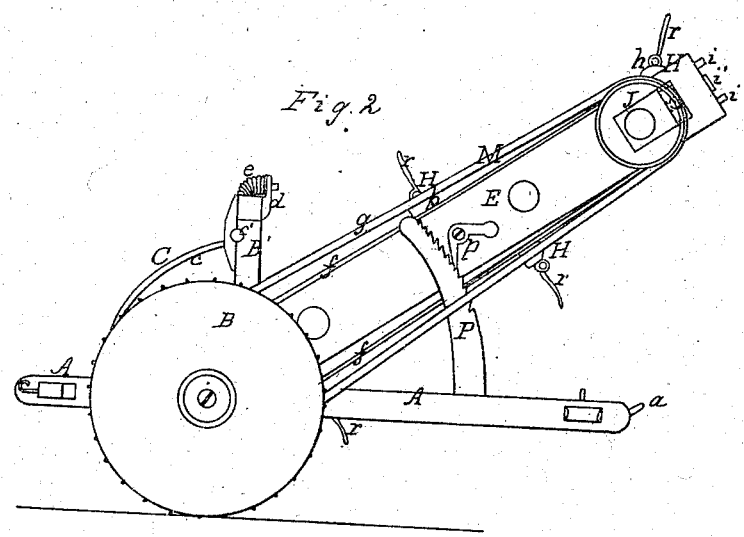
Figure 3:
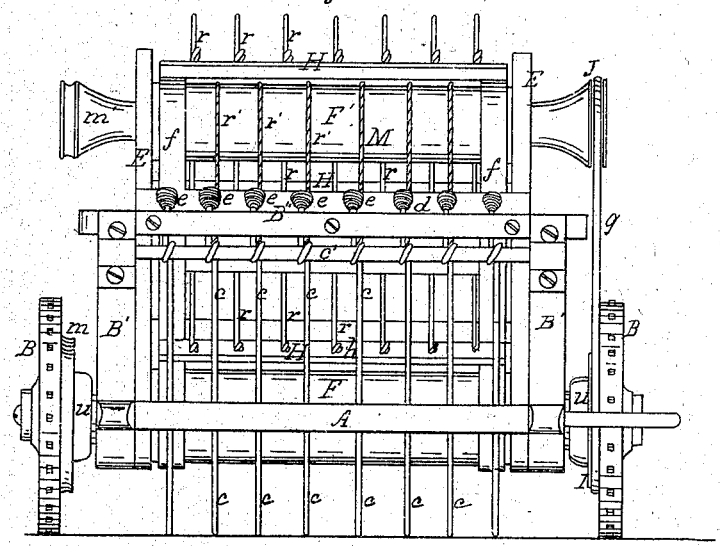
Figure 4:
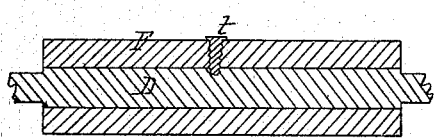
Figure 5:
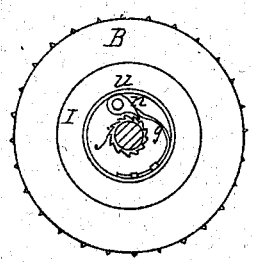

Figure 1 is a plan view of the machine. Fig. 2 is a side elevation. Fig. 3 is a view of the rear end. Figs. 4 and 5 are detached sections.

Similar letters of reference denote like parts in the different views.

My improvement relates to constructing a machine for gathering and loading flax, corn, hay, &c., by which the products are gathered off the ground and conveyed onto the load by one continuous operation.

A in Figs. 1, 2, and 3 represents a rectangular frame, supported at the rear end by wheels B, and the front end is designed to be attached at $a$ to the wagon to be loaded Above the driving-wheels, secured to the frame A, are standards B', with a piece, B'', extending between them across the top, to which a rake, C, is connected. The rake is formed, as represented, with the teeth $c$ curved round, the upper ends of which are bent or coiled round a rod, $c'$, and from that they extend up through slots in the cross-piece B'', through spiral springs $e$, out through an upright piece, $d$, secured to B''. The object of having the teeth of the rake hung in this manner with slots and springs is to render them more elastic, and cause them to pass more readily over obstacles than if rigidly attached. The rod $c'$, round which the teeth are coiled, is secured to the standards B', and the teeth and rake are so connected to the machine that the entire rake, or any one or more of the teeth, can be removed and replaced at any time, if required.

On the shaft of the driving-wheels, inside of the frame A, is placed the lower ends of side pieces, E, that support an endless carrier, M, consisting of rollers F and F', the roller F being on the shaft of the wheels B, and the roller F' is supported at the upper end of the side pieces in adjustable boxes, as indicated by the red lines in Fig. 2, that can be moved either way in slots by means of a screw, $i'$, in the center, and are retained firmly in place by pins $i$. By these adjustable boxes the roller F' can be moved, so as to loosen or tighten the straps over the rollers.

Over the ends of the rollers F and F' and extending between them are belts $f$. To these belts are attached elevators H, in the head-pieces $h$ of which are secured teeth $r$, curved at the ends and bent round in a spiral form, where they are connected to the head, rendering them stronger, and at the same time more elastic. There are five of these elevators, and there can be more or less, arranged at equal distances along the belts. Inside of the elevators, or underneath them, over the rollers, are cords or straps $r'$, to keep the products that are being elevated from falling through. There are also girts or braces $n'$ between the side pieces and secured to them.

To the sides of the frame A is secured a rack, P, that extends upon the outside of the pieces E, as represented in Fig. 2, in which a dog or pawl, $p$, pivoted to the side pieces, is placed, whereby the carrier can be inclined more or less, as may be desired, by raising up or letting down the side pieces, E, which are firmly secured in any position by putting the pawls in the racks.

On the ends of the roller F' are pulleys $m'$ and J, the pulley $m'$ on one side being of less diameter than the pulley J on the other. There are pulleys $m$ and I also on the inside of the driving-wheels. The pulley $m$ is of greater diameter than the pulley I. The object of these different-sized pulleys is to increase or decrease the speed with which the carrier is operated, as will be described.

The roller F' is on the driving-shaft D, as seen in Fig. 4, and can be secured to it or released from it by means of a screw, $t$, by which the velocity of the carrier can also be gaged, which, together with the pulleys, three different motions can be given to the carrier. By removing the belt $g$ entirely from the rollers, and detaching the roller F from the shaft, the roller F, operating the carrier, gives it the slowest motion. By putting the belt $g$ on the pulleys I and J, as represented, the pulley I, being larger than J, will increase the speed of the carrier, which can be increased still more by removing the belt and putting it on the other side over the pulleys $m$ and $m'$, $m$, being so much larger than $m'$, will materially increase the motion of the carrier.

The manner in which this machine is used in practical operation is as follows: It is attached to the rear end of the wagon that is to be loaded, and as it is driven through the field where the crop is to be gathered, the rake C gathers up the flax, hay, or whatever it may be, from which it is taken by the elevators H as they are brought round on the carrier. The teeth of the elevators extend between the teeth of the rake, and are curved upward, as represented, in passing over the top of the carrier. By these elevators the product is taken entirely off the rake C as it collects there, and is conveyed up to the front end of the carrier, which projects over the wagon, where the elevators turn gradually downward as they move round the roller F', discharging their load onto the carrier. The rapidity with which it is desired that the elevators should be carried round depends upon the abundance of the crop to be gathered, or the rapidity with which the machine is moved over the ground; for the more of the product that is gathered upon the rake, the faster must the elevators be carried round to convey it onto the load. On the inside of each of the pulleys I and $m$ of the driving-wheels is a circular box or rim, $u$, in which is arranged a spring, $g$, pawl $n$, and ratchet-wheel $j$ on the shaft D, by means of which, when the machine is moved backward, the wheels or shaft will not turn, or the motion of the carrier be reversed.

What I claim as my improvement, and desire to secure by Letters Patent, is—

1. The springs $e$ and rake C, attached to the pieces B'' $d$ of the frame, and in combination with the adjustable side pieces, E, the carrier M, elevators H, and rollers F F', when arranged and operating substantially as and for the purpose set forth.

2. The roller or sleeve F and the shaft D, in combination with the pulleys $m$ $m'$ and I J, when arranged and operating substantially as and for the purpose set forth.

G. W. HATCH.

Witnesses:
W. H. BURRIDGE,
A. W. McCLELLAND.